(12) United States Patent
Hofmann et al.

(10) Patent No.: US 8,408,367 B2
(45) Date of Patent: Apr. 2, 2013

(54) DRUM BRAKE

(75) Inventors: Dirk Hofmann, Stuttgart (DE); Willi Nagel, Remseck/Hochdorf (DE); Oliver Kriese, Sonthofen (DE)

(73) Assignee: Robert Bosch GmbH, Stuttgart (DE)

( * ) Notice: Subject to any disclaimer, the term of this patent is extended or adjusted under 35 U.S.C. 154(b) by 933 days.

(21) Appl. No.: 12/096,475

(22) PCT Filed: Oct. 30, 2006

(86) PCT No.: PCT/EP2006/067917
§ 371 (c)(1),
(2), (4) Date: Jun. 6, 2008

(87) PCT Pub. No.: WO2007/068529
PCT Pub. Date: Jun. 21, 2007

(65) Prior Publication Data
US 2008/0289922 A1    Nov. 27, 2008

(30) Foreign Application Priority Data
Dec. 14, 2005    (DE) .................... 10 2005 059 590

(51) Int. Cl.
*F16D 55/08*    (2006.01)
(52) U.S. Cl. .................... 188/72.9; 188/334; 188/325

(58) Field of Classification Search .... 188/79.51–79.62, 188/325–331, 72.9, 334, 335
See application file for complete search history.

(56) References Cited

U.S. PATENT DOCUMENTS

| | | | |
|---|---|---|---|
| 1,175,286 A | 3/1916 | Myers | |
| 1,805,190 A * | 5/1931 | Semmes | 188/328 |
| 2,096,854 A | 10/1937 | Kolarovic | |
| 5,913,390 A | 6/1999 | Hostetler | |
| 6,119,822 A | 9/2000 | Baldwin | |
| 7,182,182 B2 * | 2/2007 | Dupuis | 188/72.9 |
| 2003/0066721 A1 | 4/2003 | Pomponio, Sr. | |

FOREIGN PATENT DOCUMENTS
WO    WO 99/28649 A1    6/1999

* cited by examiner

*Primary Examiner* — Melanie Torres Williams
(74) *Attorney, Agent, or Firm* — Maginot, Moore & Beck

(57) ABSTRACT

The invention relates to a drum brake having an electromechanical actuating device. The invention proposes to convert a rotating drive movement of the actuating device by use of a gearwheel and two toothed racks. The toothed racks mesh with the gearwheel on opposite sides thereof and are driven in opposite directions by the gearwheel into translational movements for pressing attached brake shoes against a brake drum. The toothed racks are configured in such a way that the two toothed racks have a common line of action, with resulting symmetrical actuating forces. According to one embodiment of the invention, the lines of action of the toothed racks run tangentially with respect to the gearwheel.

20 Claims, 3 Drawing Sheets

DRUM BRAKE

CROSS-REFERENCE TO RELATED APPLICATION

This application is a 35 USC 371 application of PCT/EP 2006/067917 filed on Oct. 30, 2006.

BACKGROUND OF THE INVENTION

1. Field of the Invention

The invention relates to a drum brake having an electromechanical actuating device.

2. Description of the Prior Art

Drum brakes are known per se. They have two brake shoes, which for actuation of the drum brake can be pressed by an actuating device against a brake drum. The actuating device may for instance be hydraulic or mechanical; for instance, it may have a pivotable double cam that presses the two brake shoes apart on one end and against the brake drum.

SUMMARY AND ADVANTAGES OF THE INVENTION

The actuating device of the drum brake of the invention has one rotationally drivable gear wheel and two toothed racks, which mesh on diametrically opposite sides with the gear wheel and each of which is coupled to one of the two brake shoes of the drum brake. The two toothed racks need not necessarily mesh with the gear wheel while being exactly diametrically opposite one another and need not extend parallel to one another; an angular deviation is possible. By rotation of the gear wheel, the toothed racks are moved in contrary directions and press the brake shoes against the brake drum, or in the opposite direction of rotation of the gear wheel, the toothed racks lift the brake shoes from the brake drum. Hence one advantage of the invention is the possibility that the brake shoes can be actively lifted from the brake drum; that is, the drum brake can be actively released, using the actuating device. A further advantage, compared to cam actuation, is reduced friction within the actuating device and reduced hysteresis upon actuation and release of the drum brake. Still another advantage of the invention, that is, continuously variable wear readjustment, is simplified by rotating the gear wheel about a certain angle of rotation upon release of the drum brake almost back to its outset position.

The actuating device of the drum brake of the invention has only linear transmission members. As a consequence, a drive torque of the actuating device is proportional to a contact pressure of the brake shoes against the brake drum, if the effects of friction and hysteresis are ignored. A braking force of the drum brake of the invention is therefore simpler to control or regulate. The contact pressure of the brake shoes against the brake drum need not be measured directly; instead, a drive torque of an electric motor that drives the gear wheel can for instance be used to control or regulate a braking force of the drum brake.

The invention provides a locking device, with which the actuating device can be locked in its position at the time. It may for instance be a magnet brake or a shiftable freewheel, which in the engaged state blocks the actuating device from rotating the gear wheel, which meshes with the toothed racks, in reverse in the release direction. The locking device can be monostable or bistable. With it, first, the air play can be readjusted to compensate for wear, by locking the actuating device upon release or after release of the drum brake once a predetermined air play is reached. Second, the locking device of the actuating device embodies the drum brake as a parking brake; it can be locked in the actuated position without current or energy.

One embodiment of the invention provides that the brake shoes of the drum brake of the invention are displaceably guided radially to the brake drum. As a result, the drum brake has no leading and trailing brake shoes that bring about self-boosting or self-weakening and that lead to variable lining wear of the leading and trailing brake shoes as well as variable contact pressures. The radially displaceable guidance of the brake shoes has the advantage of uniform, symmetrical stress on the actuating device and uniform lining wear of the brake linings of the two brake shoes. A further, major advantage of the radially displaceably guided brake shoes is reduced vulnerability of the braking parameter C* of the drum brake of the invention upon fluctuations in the coefficient of friction. The braking parameter C* is the ratio of the braking force (circumferential force) that is operative at the brake drum and the contact pressure of the brake shoes against the brake drum. Any change in the braking parameter upon a change in the coefficient of friction is less; that is, the ratio $\Delta C^*/\Delta\mu$ is more constant than in conventional drum brakes that have one leading and one trailing brake shoe, or even in duplex brakes that have two leading brake shoes. As a result, control or regulation of a braking force of the drum brake of the invention is simplified. In particular, anti-lack and slip control systems, such as anti-lock brakes (ABS), traction control systems (TCS), and vehicle dynamics control (ESP, or electronic stability program) are simplified considerably, compared to major nonlinearity, with increased constancy of the braking parameter C*.

BRIEF DESCRIPTION OF THE DRAWINGS

The invention will be described in further detail below in terms of exemplary embodiments shown in the drawings. In the drawings.

DESCRIPTION OF THE PREFERRED EMBODIMENTS

Figure 1:
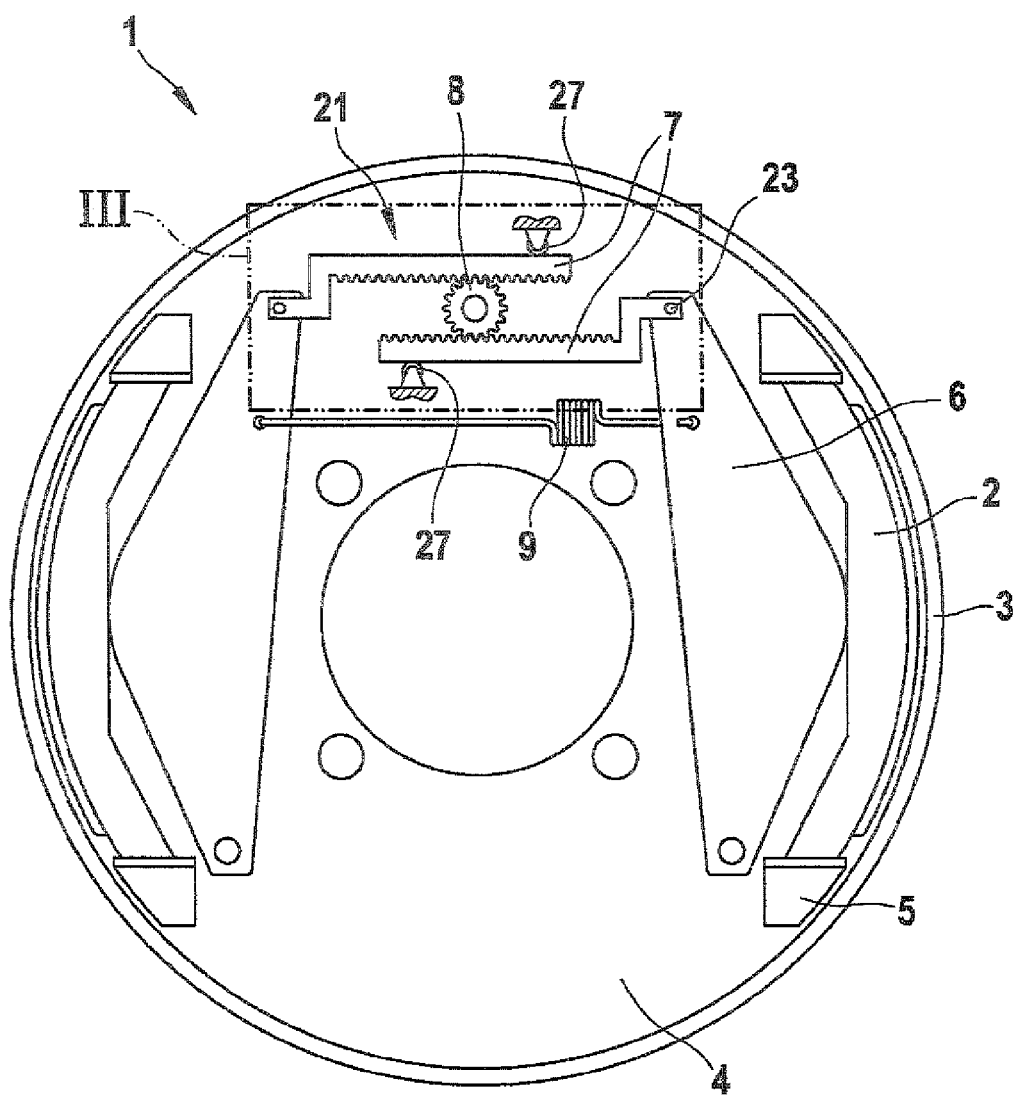
FIG. 1 is an elevation of a drum brake of the invention.

The drum brake 1 according to the invention shown in FIG. 1 has two brake shoes 2, which are disposed diametrically opposite one another and which for actuation of the drum brake 1 can be pressed outward against an inside circumference of a brake drum 3. The brake shoes 2 are guided displaceably, radially to the brake drum 3, on a holder plate 4, in the form of a circular perforated disk, of the drum brake 1. To that end, the holder plate 4 has bearing blocks 5, which are disposed on ends of the brake shoes 2 and which guide the brake shoes 2 radially displaceably.

In order to press the brake shoes 2 outward against the brake drum 3, the drum brake 1 has actuating levers 6, which are disposed radially inside the brake shoes 2. The actuating levers 6 are supported pivotably on one end thereof on the holder plate 4. The other ends of the actuating levers 6 are pivotably connected each to a respective toothed rack 7; that is, the actuating levers 6 are coupled with the toothed racks 7. The toothed racks 7 are disposed diametrically opposite one another with respect to a gear wheel 8 disposed between them and are parallel to one another. At diametrically opposed circumferential points, the toothed racks 7 mesh with the gear wheel 8. By driving the gear wheel 8 to rotate, the toothed racks 7 are displaced in contrary directions and press the two actuating levers 6 apart. The actuating levers 6 press the brake shoes 2 outward against the brake drum 3, so that the brake drum 3 is braked. The drum brake 1 is actuated. In the opposite direction of rotation of the gear wheel 8, the toothed racks 7 pull the actuating levers 6 inward back into an outset position. The drum brake 1 is released as a result. In addition, a spring element 9 in the form of a helical tension spring is provided, which is suspended from the two actuating levers 6 and pulls them together or in other words inward.

Figure 2:
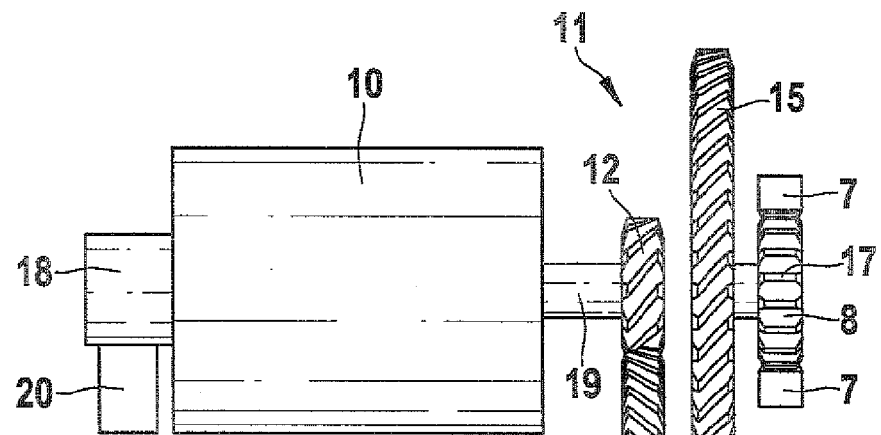
FIG. 2 shows an actuating device of the drum brake of FIG. 1.

For the rotational drive of the gear wheel 8, the drum brake 1 has the electric motor 10, shown in FIG. 2, which drives the gear wheel 8 to rotate via a step-down gear 11. The step-down gear 11 is a two-stage spur gear train having the four gear wheels 12 through 15. The gear wheel 8 that meshes with the toothed racks 7 is fixed against relative rotation with respect to a driven gear wheel 15 of the step-down gear 11. The gear wheels 12 through 15 of the step-down gear 11 have helical toothings 16. This has the advantage of smoother operation, less noise, and more-uniform transmission of the torque. In contrast to this, both the gear wheel, meshing with the toothed racks 7, and the toothed racks 7 themselves have spur toothings 17. As a result, a transverse force component upon driving of the toothed racks 7 by the gear wheel 8 is avoided. The toothed racks 7 need not be braced against transverse forces.

A shiftable freewheel 18 is flanged to the electric motor 10 and acts on a shaft 19 of the electric motor 10. In the engaged position, the freewheel 18 blocks the motor shaft 19 against rotating in reverse in the direction of releasing the drum brake 1. A braking force exerted is maintained while the electric motor 10 is without current. As a result, the drum brake 1 can be used not only as a service brake but also as a parking brake. The freewheel 18 forms a locking device of the drum brake 1. An air play between the brake shoes 2 and the brake drum 3 can also be set by means of the freewheel 18, in that upon release of the drum brake 1, the motor shaft 19 is blocked by the freewheel 18 against further reverse rotation in the direction of releasing the drum brake 1 once a desired air play is reached. For disengagement, the freewheel 18 has a lifting magnet 20. When current is supplied to the lifting magnet 20, the freewheel 18 is disengaged; that is, the motor shaft 19 is freely rotatable in both directions of rotation. When the freewheel 18 is engaged, or in other words the lifting magnet 20 is not supplied with current, the motor shaft 19 is rotatable in only a tightening direction, in which the brake shoe 2 is pressed outward and the drum brake 1 is actuated. The freewheel 18 is monostable; its engaged position is stable. A bistable freewheel 18 may also be used, in which the lifting magnet 20 need merely be supplied with current to switch from one position to the other. Such freewheels 18 are known per se; as an example, see German Patent Disclosure DE 102 55 192 A1.

The electric motor 10, with the freewheel 18 flanged to it; the step-down gear 11; the toothed racks 7; and the gear wheel 8 meshing with the toothed racks all form an electromechanical actuating device 21 of the drum brake 1.

Figure 3:
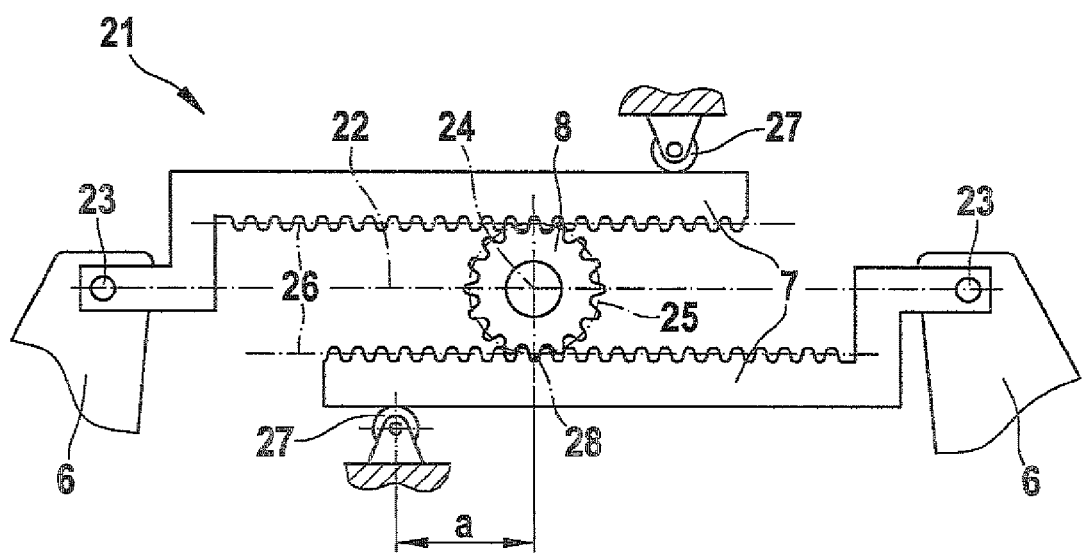
FIG. 3 is an enlarged view of part of the actuating device of the drum brake in the direction of the arrow III in FIG. 1.

As can be seen in FIG. 3, the two toothed racks 7 are bent at right angles in such a way that they have a common imaginary line of action 22. The line of action 22 is a straight line that passes through pivot bearings 23, which connect the toothed racks 7 in articulated fashion to the actuating levers 6 of the drum brake 1. The line of action 22 indicates the direction of the actuation forces that the toothed racks 7 exert on the actuating levers 6 upon actuation of the drum brake 1. As a result, the actuation forces exerted on the actuating levers 6 by the toothed racks 7 are not offset from one another but instead have a common line of action 22; if the actuation forces exerted on the actuating levers 6 and, because of the symmetrical construction of the actuating levers 6 and brake shoes 2, the contact pressures exerted on the brake shoes 2 are of the same magnitude, then both brake shoes 2 are pressed against the brake drum 3 with the same contact pressure. The right-angle bend of the toothed racks 7 is selected in such a way in FIG. 3 that the line of action 22 of the actuation forces exerted by the toothed racks 7 on the actuating levers 6 intersects an axis of rotation 24 of the gear wheel 8 that meshes with the toothed racks 7. As a result, a symmetrical construction of the actuating device is attained, including in the region of the toothed racks 7 and the gear wheel 8 meshing with them. Because of the right-angle bend of the toothed racks 7, actuating the drum brake 1 exerts a torque on the toothed racks 7. This torque is due to an offset among the actuation forces, which engage the pivot bearings 23 of the toothed racks 7, and drive forces, which the gear wheel 8 exerts on the toothed racks 7. The drive forces engage a rolling circle 25 of the gear wheel 8 and a rolling line 26 of the toothed racks 7.

The drum brake 1 has a roller bearing 27 for the toothed racks 7, which is offset toward a side remote from the actuating lever 6 relative to the gear wheel 8 which meshes with the toothed racks 7 and with which the respective toothed rack 7 is coupled. The offset a of the roller bearing 27 from an engagement point 28 of the toothed rack 7 on the gear wheel 8 causes the torque, exerted by the actuation force on the toothed rack 7, to keep the toothed rack 7 in engagement with the gear wheel 8. The torque causes the toothed rack 7 to be pressed toward the gear wheel 8. The offset a is selected to be great enough that the drive force, which is exerted by the gear wheel 8 on the toothed rack 7 and which has a component that, because of the shape of the teeth of the gear wheel 8 and of the toothed rack 7, points away from the gear wheel 8, is compensated for or overcompensated for. For rectilinear guidance of the toothed rack 7, the one roller bearing 27 is thus at least theoretically sufficient. This does not preclude additional structural guide elements or bearing points of the toothed rack 7 (although these are not shown). The engagement point 28 of the gear wheel 8 on the toothed rack 7 specifically means the geometric contact point of a rolling circle 25 of the gear wheel 8 and a rolling line 26 of the toothed rack 7.

Figure 4:
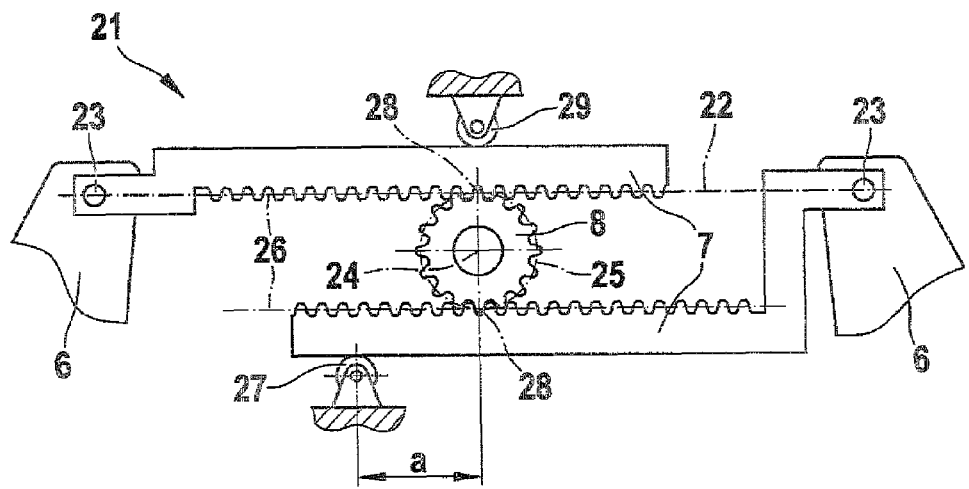
FIG. 4, in a view corresponding to FIG. 3, shows a modified actuating device of the drum brake according to the invention.

In a modification of the invention shown in FIG. 4, the right-angle bend of the toothed racks 7 is changed. The right-angle bend of the toothed rack 7 shown at the top in FIG. 4 is selected such that the line of action 22 of the actuation force exerted by the toothed rack 7 on the actuating lever 6 extends at a tangent to the rolling circle 25 of the gear wheel 8 that meshes with the two toothed racks 7. As a result, this toothed rack 7 is torque-free; it is subjected solely to tensile or compressive stress and not bending stress and in order to be guided linearly it theoretically needs merely to be kept in engagement with the gear wheel 8. For that purpose, a roller bearing 29 is provided, which braces the toothed rack 7 on a side remote from the gear wheel 8. The roller bearing 29 is disposed on an imaginary radial of the gear wheel 8, meshing with the toothed rack 7, through the engagement point 28 of the toothed rack 7 and the gear wheel 8. Once again, additional guide elements for linear guidance of the toothed rack 7 are possible, but are not shown.

The right-angle bend of the second toothed rack 7, shown at the bottom in FIG. 4, is enlarged in FIG. 4 compared to FIG. 3, so that the lines of action 22 of the actuation forces, exerted by the toothed racks 7 on the actuating levers 6, are once again located on the same line. This line or straight line is the tangent, mentioned above in connection with the toothed rack 7 shown at the top in FIG. 4, to the rolling circle 25 of the gear wheel 8 that meshes with the two toothed racks 7. The result is the symmetrical conditions, already explained in conjunction with FIG. 3, with respect to both the gear wheel 8 and the actuating levers 6. The drive forces exerted by the gear wheel 8 on the two toothed racks 7, like the actuation forces exerted by the toothed racks 7 on the actuating levers 6 coupled with them, are of the same magnitude. As a result, what acts on the gear wheel 8 is solely torque, and not a force transverse to its axis of rotation 24 that would have to be braced. The forces exerted on the actuating levers 6, and thus also the contact pressures of the brake shoes 2 against the brake drum 3, are likewise of equal magnitude.

A roller bearing 27 of the toothed rack 7 shown at the bottom in FIG. 4, having the larger right-angle bend, is, as explained in conjunction with FIG. 3, offset by the distance a away from the actuating lever 6 with respect to the engagement point 28 of the toothed rack 7 and the gear wheel 8. The offset a is again selected to be large enough that the torque which the actuation force, exerted by the toothed rack 7 on the actuating lever 6, and the drive force of the gear wheel 8 on the toothed rack 7, which force engages in offset fashion in accordance with the right-angle bend of the toothed rack 7, exert on the toothed rack 7 keeps the toothed rack 7 in engagement on the gear wheel 8. Once again, additional roller bearings and/or sliding guides for the toothed rack 7 may in practice be useful (not shown). Otherwise, with regard to FIG. 4, the description of FIG. 3 applies, which is referred to for the sake of avoiding repetition. For identical components, the same reference numerals are used.

Figure 5:
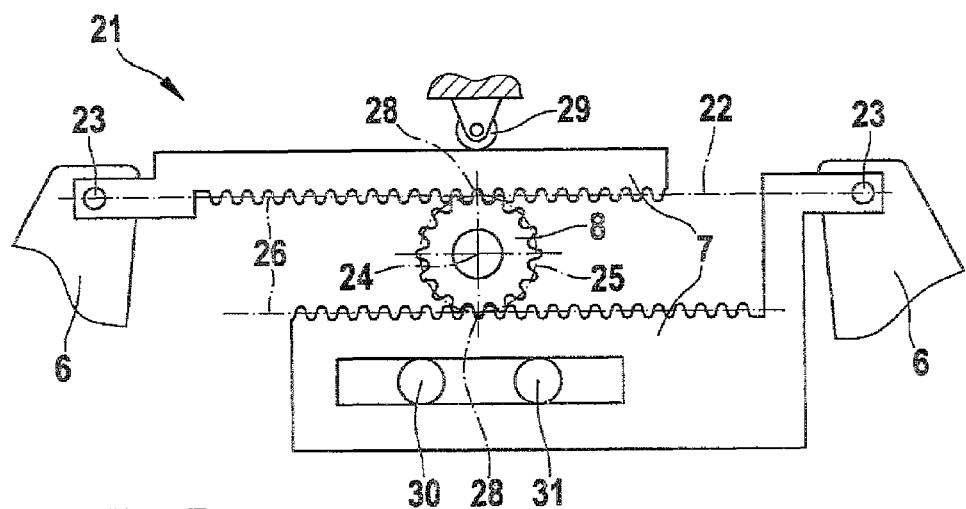
FIG. 5, in a view corresponding to FIG. 3, shows a further modified actuating device of the drum brake according to the invention.

FIG. 5 shows a modification of FIG. 4. The toothed rack 7 shown at the top is embodied identically to what is shown in FIG. 4; its right-angle bend is selected such that the line of action 22 of the actuation force exerted by the toothed rack 7 on the actuating lever 6 is at a tangent to the rolling circle 25 of the gear wheel 8. In FIG. 5 as in FIG. 4, the roller bearing 29 of the toothed rack 7 is disposed on an imaginary radial of the gear wheel 8 through it point 28 of engagement with the toothed rack 7.

The right-angle bend of the toothed rack 7 shown at the bottom in FIG. 5 is also so large, as in FIG. 4, that the lines of action 22 of the actuation forces, exerted by the toothed racks 7 on the actuating levers 6, are located on a common straight line, specifically a tangent to the rolling circle 25 of the gear wheel 8. Solely the rectilinear guidance of the toothed rack 7 shown at the bottom in FIG. 5 has changed in comparison with FIGS. 3 and 4: The toothed rack 7 is embodied as a frame in which two roller bearings 30, 31 are provided, which guide the toothed rack 7 rectilinearly and at a tangent to the gear wheel 8 in compulsory fashion and keep the toothed rack 7 in engagement with the gear wheel 8. Otherwise, for FIG. 5, see the descriptions of FIGS. 3 and 4. The roller bearings 30, 31 are disposed on both sides of the engagement point 28 of the gear wheel 8 and the toothed rack 7; that is, they are offset in both directions with respect to the engagement point 28.

Instead of the roller bearing 27, 29, 30, 31, slide bearings are intrinsically also possible (not shown) as guides of the toothed racks 7, which brace the toothed racks 7 and keep them in engagement with the gear wheel 8. However, because they have less friction, the roller bearings 27, 28, 30, 31 are preferred.

The actuating device 21 of the drum brake 1, with the gear train 11 and the toothed racks 7 that mesh with the gear wheel 8, has solely linear transmission members. A drive torque of the electric motor 10 is proportional to the contact pressure of the brake shoes 2 against the brake drum 3. Control or regulation of the braking force of the drum brake 1 is thus simplified, in particular with a view to an anti-lock brake system or traction control system.

The foregoing relates to the preferred exemplary embodiment of the invention, it being understood that other variants and embodiments thereof are possible within the spirit and scope of the invention, the latter being defined by the appended claims.

The invention claimed is:

1. A drum brake comprising:
an electromechanical actuating device;
two brake shoes;
a brake drum, the two brake shoes being pressed against the brake drum by the actuating device for actuation of the drum brake;
a holder plate on which the two brake shoes are guided displaceably, radially to the brake drum, the holder plate having bearing blocks which are disposed on opposing ends of each of the two brake shoes and which guide the brake shoes radially displaceably relative to the holder plate and to the brake drum;
the actuating device having a rotationally drivable gear wheel defining an axis of rotation, the location of which is fixed with respect to the holder plate;
the actuating device further having two toothed racks which mesh with the gear wheel on diametrically opposite sides thereof, wherein each of the two toothed racks is operatively coupled to a respective one of the two brake shoes such that rotation of the gear wheel causes the two brake shoes to be pressed against the brake drum; and
the actuating device further having two actuating levers operatively coupling each of the two toothed racks to a respective one of the two brake shoes, the two actuating levers being disposed separately from and radially inside the two brake shoes respectively, and being supported pivotably on the holder plate at a first end of each of the two actuating levers, and the two actuating levers being pivotably connected with the toothed racks at a second end of each of the two actuating levers, wherein a pivoting motion of the two actuating levers translates to a linear displacement of the two brake shoes.

2. The drum brake according to claim 1, wherein the toothed racks and the gear wheel meshing therewith have spur toothings.

3. The drum brake according to claim 1, wherein the toothed racks have rectilinear guides which are parallel to a tangential direction of the gear wheel.

4. The drum brake according to claim 1, wherein the actuating device has a gear train with helical toothings wherein the gear wheel is fixed against relative rotation with respect to a driven gear wheel of the gear train.

5. The drum brake according to claim 1, wherein the actuating device has solely linear transmission members.

6. The drum brake according to claim 1, wherein the actuating device includes a motor operatively coupled to the gear wheel to drive the gear wheel about the axis of rotation and a locking device operatively coupled to the gear wheel to prevent the motor from driving the gear wheel.

7. The drum brake according to claim 1, wherein the brake shoes are displaceably guided radially to the brake drum.

8. The drum brake according to claim 1, wherein lines of action of actuation forces, which the two toothed racks upon actuation of the drum brake exert on the brake shoes, are located on one line.

9. The drum brake according to claim 1, wherein a line of action of an actuation force, which one of the two toothed racks upon actuation of the drum brake exerts on the brake shoe coupled with it, extends tangentially to a rolling circle of the gear wheel that meshes with the two toothed racks.

10. The drum brake according to claim 9, wherein the toothed rack has a roller bearing which is bracingly disposed on a back side of the toothed rack remote from the gear wheel, the roller bearing displaceably guiding the toothed rack and maintaining engagement of the toothed rack with the gear wheel.

11. The drum brake according to claim 1, wherein actuation forces, which the two toothed racks upon actuation of the drum brake exert on the brake shoes, have a common line of action.

12. The drum brake according to claim 1, wherein at least one of the two toothed racks has a roller bearing which is offset in a longitudinal direction of the toothed rack, away from the brake shoe with which the toothed rack is coupled, with respect to an engagement point between the toothed rack and the gear wheel.

13. The drum brake according to claim 1, wherein the toothed rack has roller bearings on both sides of an engagement point between the toothed rack and the gear wheel, the roller bearings bracing the toothed rack in both directions toward away from the gear wheel relative to the engagement point.

14. A drum brake comprising:
two brake shoes;
a brake drum, the two brake shoes being pressed against the brake drum by an actuating device;
a holder plate on which the two brake shoes are guided displaceably, radially relative to the holder plate and to the brake drum;
the actuating device including a rotationally drivable gear wheel having an axis of rotation the location of which is fixed with respect to the holder plate, and a first and a second toothed rack each of which mesh with the gear wheel and which are each coupled to a respective one of two actuating levers, the two actuating levers being respectively disposed separately from and radially inside the two brake shoes and being supported pivotably on the holder plate at a first end of each of the two actuating levers, the two actuating levers being pivotably respectively coupled to each of the first and second toothed racks at a second end of each of the two actuating levers, wherein a pivoting motion of the two actuating levers translates to a linear displacement of the two brake shoes to cause the brake shoes to be pressed against the brake drum;
a motor operatively coupled to the gear wheel to drive the gear wheel about the axis of rotation; and
a locking device operatively coupled to the motor to prevent the motor from driving the gear wheel in at least one direction.

15. The drum brake according to claim 14, wherein the first toothed rack has a first roller bearing bracingly disposed on a back side of the first toothed rack remote from the gear wheel, the first roller bearing displaceably guiding the first toothed rack and maintaining engagement of the first toothed rack with the gear wheel.

16. The drum brake according to claim 15, wherein the second toothed rack has a second roller bearing bracingly disposed on a back side of the second toothed rack remote from the gear wheel, the second roller bearing displaceably guiding the second toothed rack and maintaining engagement of the second toothed rack with the gear wheel.

17. The drum brake according to claim 14, wherein actuation forces, which the first and the second toothed racks upon actuation of the drum brake exert on the brake shoes, have a common line of action.

18. The drum brake according to claim 17, wherein the common line of action passes through the axis of rotation of the gear wheel.

19. The drum brake according to claim 17 wherein the common line of action passes through a tangent of a rolling circle of the gear wheel that meshes with the first and the second toothed rack.

20. The drum brake according to claim 14, wherein the locking device includes one of a magnet brake and a shiftable freewheel.

* * * * *